Nov. 24, 1964  D. SILVERMAN  3,158,846
INFORMATION RETRIEVAL SYSTEMS
Filed Jan. 23, 1961  7 Sheets-Sheet 1

INVENTOR.
Daniel Silverman

INVENTOR.
Daniel Silverman

INVENTOR.
Daniel Silverman

INVENTOR.
Daniel Silverman

Nov. 24, 1964  D. SILVERMAN  3,158,846
INFORMATION RETRIEVAL SYSTEMS
Filed Jan. 23, 1961  7 Sheets-Sheet 5

INVENTOR.
Daniel Silverman

Nov. 24, 1964   D. SILVERMAN   3,158,846
INFORMATION RETRIEVAL SYSTEMS
Filed Jan. 23, 1961   7 Sheets-Sheet 7

INVENTOR.
Daniel Silverman

United States Patent Office 3,158,846
Patented Nov. 24, 1964

3,158,846
INFORMATION RETRIEVAL SYSTEMS
Daniel Silverman, 5969 S. Birmingham Ave.,
Tulsa, Okla.
Filed Jan. 23, 1961, Ser. No. 84,026
17 Claims. (Cl. 340—174.1)

This invention is related to the general field of the storage and retrieval of information. It is concerned with the storage of information in the form of digits or bits of information, which may be arranged in the form of one or two dimensional arrays of points, characters, marks, or small areas of specific properties, distinguishable from those of the information carrier, or record sheet, strip, card, plate, or cylinder. It is concerned also with information in the form of photographic reproductions which may be part of such a record, impressed on said record in association with an identifiable array of characters. An example of these types of records might be microfilms, microcards, punched tapes or cards. They would include also mechanically, chemically, electrically, xerographically, photographically, or otherwise printed, sheets or strips in the form of conventional alphanumeric characters, printed with or without associated patterns of identifiable characters.

This invention is more particularly related to information storage records of these types in which the size of the storage elements is small, so that a maximum of information can be stored in a minimum of volume, and a search of the information can be made as rapidly as possible. These two specifications require that the information be arranged in regular order and of small size.

In the art there are various ways shown to accomplish these objectives. In my patent, U.S. No. 2,820,907, issued January 21, 1958, I show how, by the use of reference indicia placed on the information record in precise relationship to the information, and by using appropriate scanning means for said indicia, it is possible to control the transverse position of the record so that the information pattern lines up, or registers, with the scanning pattern. Where a multiplicity of information tracks are present on the record and are scanned simultaneously, my method works well, although the process of mechanically moving the record, or the image of the record, limits the speed of control. There are other ways of accomplishing the same results at higher speed by moving the light sourse electronically so as to match or register an optical pattern of the record with the scanning detectors. This result is obtained at the expense of greater complexity, for example, by using cathode ray spots as light sources, and other ways.

The cathode ray method is particularly useful where a single track of information is used since a single cathode ray spot and a single photoelectric detector can be used. Because of the low light intensity of the light spot, however, very sensitive photoelectric detectors are necessary, which are troublesome and expensive. In this invention I do not require an accurate register between the record and the scanner. I show how it is possible to utilize the general arrangement of apparatus of my Patent No. 2,820,907, and still enjoy extremely rapid control of scanning, irrespective of wide ranging transverse motion of the record.

What I propose in the way of a storage record is a sheet, strip, card, plate, or other form of material, which may be metal, paper or plastic, or the like. The record will be, for convenience, discussed as a strip, although it will be well understood that it can be in any other form, such as sheet, disc, cylinder, etc. This record strip is capable of any desired change in properties over a localized area or spot, to form an identifiable spot, area, mark, or character. For example, the spots can be formed by light acting on a photographic film or paper, ink or other pigment on paper or plastic, placed there by electrostatic forces or mechanical means, marks on electrical sheets formed by electrical currents, magnetized areas on a magnetizable sheet, etc. I contemplate also the use of characters or spots of different properties on the same sheet. For convenience, I will discuss the general principles in terms of the photographic recording of spots on a photosensitive film.

Consider a strip with two parallel columns of spots, or tracks. In one, the information track, the spots are in proper code to represent specific items of information. The second is a control track which is spaced apart a distance $d$ from and parallel to the information track. The control track carries control signals which, for example, may be steady state, A.C. or D.C.

In the scanner, means are provided for transporting this strip longitudinally, and back lighting it so that the pattern of transparent spots will show up as light spots. An image of this light spot pattern will be thrown onto the detectors that are set behind an appropriate mask, having a linear opening or slit set at right angles to the longitudinal direction of motion of the tracks.

A group of 3, 5, or more, control detectors are provided and an equal number of information detectors. Each are of the same width, and preferably the same width as each of the two tracks, which preferably are of equal width. All detectors are firmly fastened in a rigid array behind the mask. The centers of the two groups of detectors are spaced apart a distance $d$ and are lined up behind the nominal position of their respective tracks.

Switch means, which can be electromechanical relays, vacuum tubes or solid state devices, are provided to connect any desired one of the information detectors to a display circuit. Each of the control detectors has an electrical output which can be measured, and the one with the highest output can be used to control the appropriate switch means to connect the corresponding detector (in the group of information detectors) to the said display. For example, let the strip be in its nominal, or central, position transversely, while it (or its image) is being traversed longitudinally past the detectors. Control signal from the center control detector will thus be maximum and that from the adjacent ones on left or right will be zero. At the same time the signal output from the center information detector will be maximum and that from the adjacent ones zero. So the signal from the center control detector is used to control the switch means to connect into the information display circuit, the signal from the center information detector. Now, assume that the strip moves so that the control track is centered over the left control detector. Its output will now be a maximum, and so the corresponding, or left, information detector will be switched into circuit. But the information track will now be in front of the left detector, so full retrieval will again be obtained.

I contemplate using preferably more than three control detectors—as many as necessary in view of the possible lateral movement of the strip—and to use a corresponding number of information detectors, for a single information track. If there are more than one information tracks, and if we consider the clear space between the tracks equal in width to that of a track, for M information tracks, there will be required $2M+N-2$ information detectors, where the N is the number of control detectors. This number of detectors will provide continuous uninterrupted simultaneous recording from the M tracks while permitting freedom of motion of the record strip to a total excursion of $N$ times $W$, the width of the tracks.

It is possible also to utilize a single information track for both the control detectors and the information detectors, which obviates the need of the control track per se. Also, it is possible to utilize a single array of detectors to serve the purpose of both the control and the information detectors, as will be explained later. It is possible also to utilize information spots of different physico-chemical properties (which, of course, are scanned by detectors sensitive to those properties) whereby optimum space utilization of the record is obtained, and also a combination of permanent (non-erasable) and erasable storage can be provided.

It is thus a principal objective of my invention to provide a method and apparatus for storing information in small space and to retrieve it rapidly.

It is a further objective to obviate the need for accurate register between the record and the detector array, and thus to provide a means for allowing considerable latitude in the transverse position of the record as it traverses in a longitudinal direction past the scanner, without affecting the scanning process.

Another objective of my invention is to provide a single track, or multiple tracks of information on the record, the data in which can be read sequentially or simultaneously.

Another important objective of my invention is to provide a scanner in which a multiplicity of information tracks are read simultaneously even though the width of the individual detectors may be greater than the width of the track.

Another objective of my invention is to combine on a single record, information in the form of spots of different physico-chemical properties, whereby a greater efficiency of information storage is obtained.

Another objective of my invention is to combine permanent and erasable storage means on a single record to provide for the storage of permanent and changing information on a given subject.

These and other important objectives, advantages, and features of this invention should become apparent from the following detailed description, which is taken in conjunction with the accompanying drawings, in which.

Figure 4:
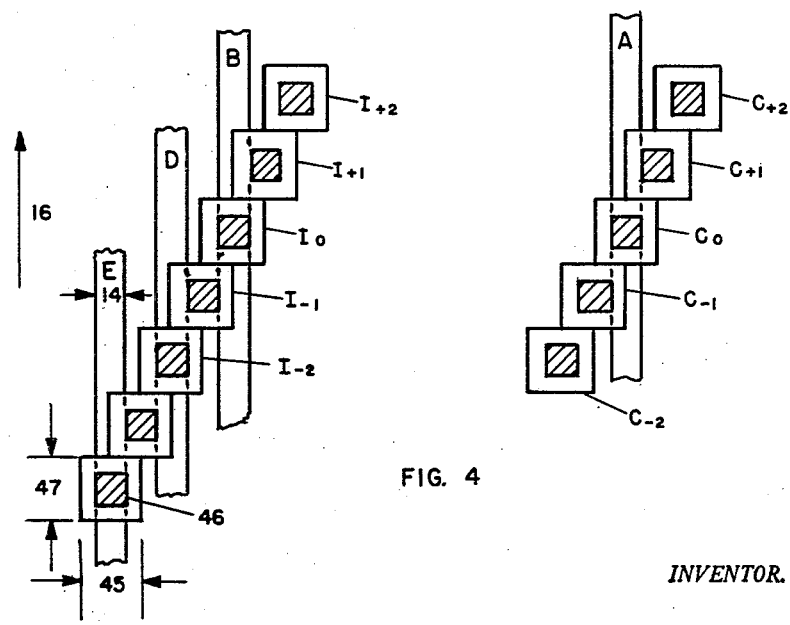
FIGURE 4 shows one possible arrangement of apparatus when the detectors are of greater transverse dimension than that of the tracks.
Figure 5:
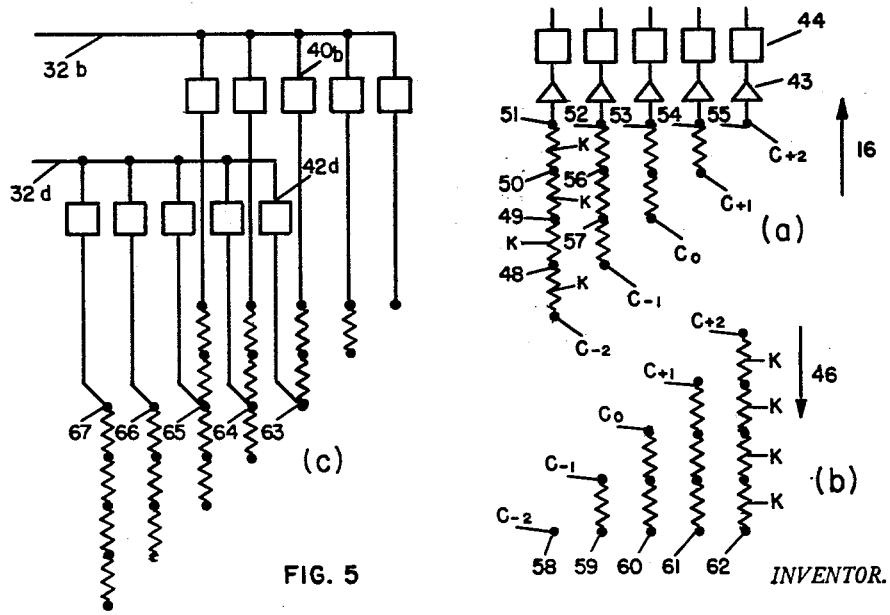

FIGURE 5 indicates the necessary time delay networks that are required to be used with the embodiment of FIGURE 4.

Figure 6:
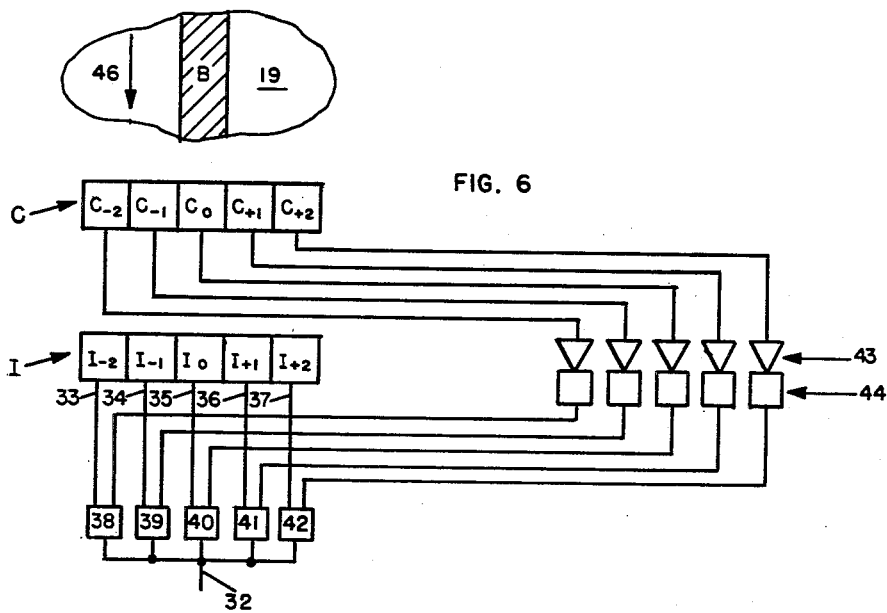

FIGURE 6 illustrates the embodiment in which the information and control features of the record are combined in a single track.

Figure 7:
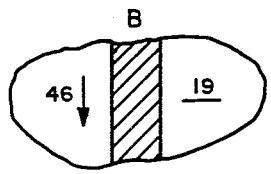
Figure 7:
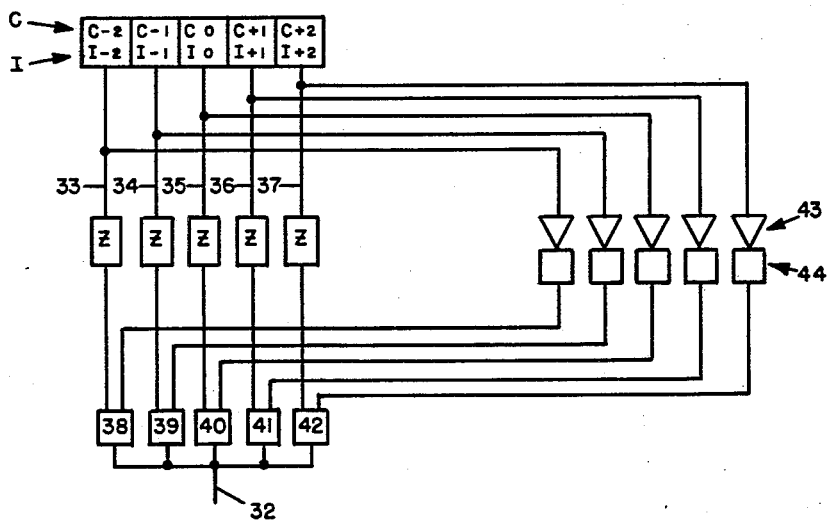

FIGURE 7 illustrates the same embodiment as FIGURE 6 except that in addition, a single array of detectors is provided to serve as information and control detectors.

Figure 8:
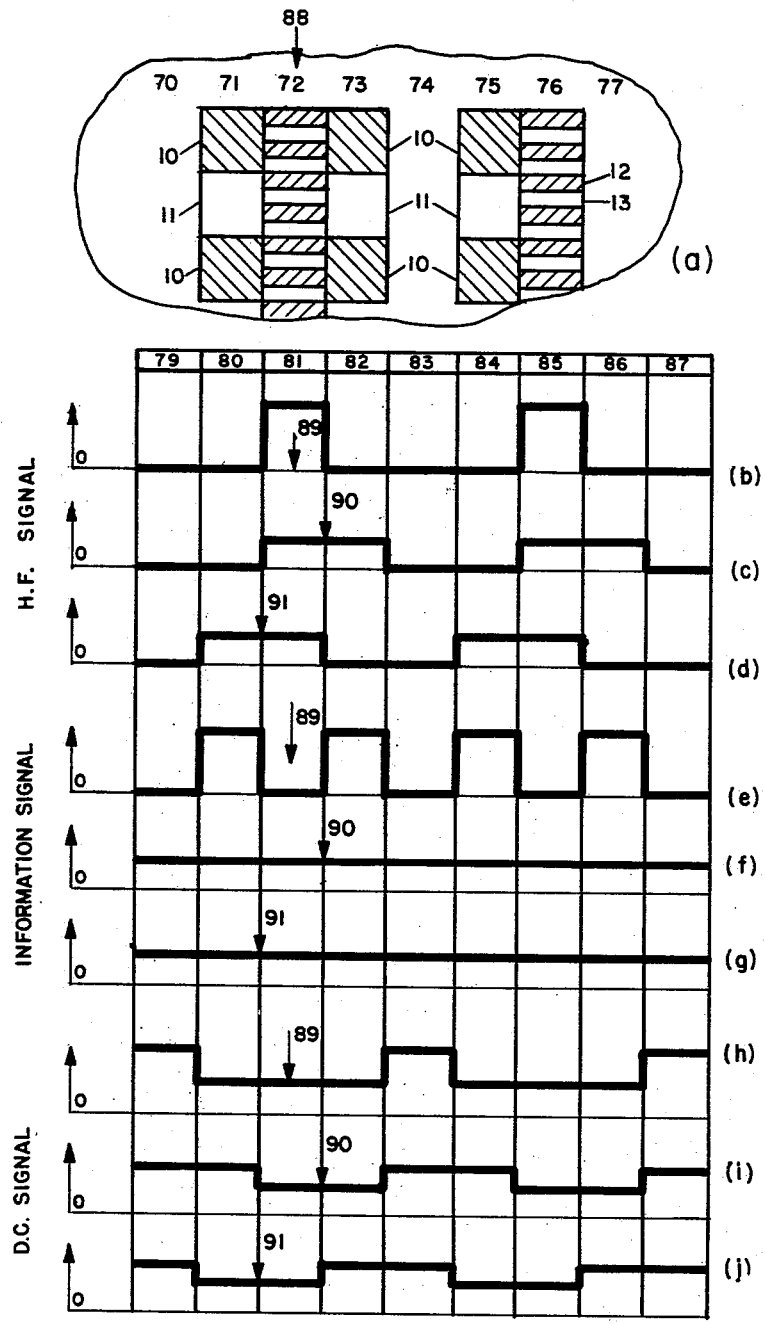

FIGURE 8 illustrates an embodiment of my invention in which information and control features are provided in adjacent tracks of a multiplicity of contiguous tracks.

Figure 9:
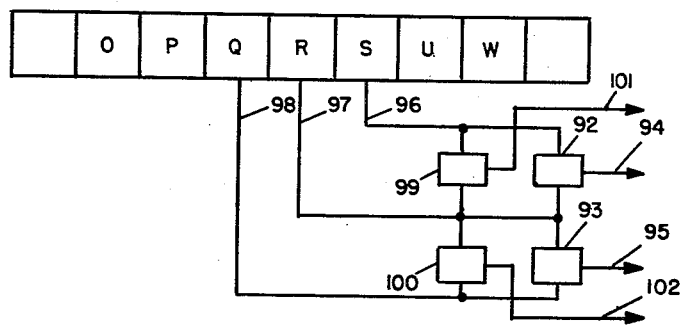

FIGURE 9 illustrates how a number of parameters of the information signals being recorded on the detectors can be obtained for the purpose of controlling the switching of the information signals.

Figure 10:
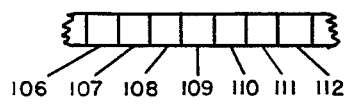

FIGURE 10 illustrates a preferred arrangement of detectors for the case of contiguous multiple tracks.

Figure 11:
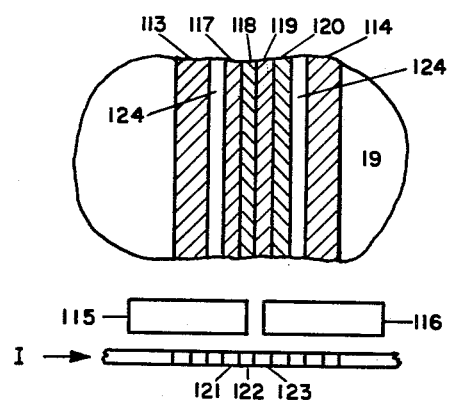

FIGURE 11 illustrates one embodiment of a storage record combining permanent (non-erasable) and temporary (erasable) storage.

Figure 12:
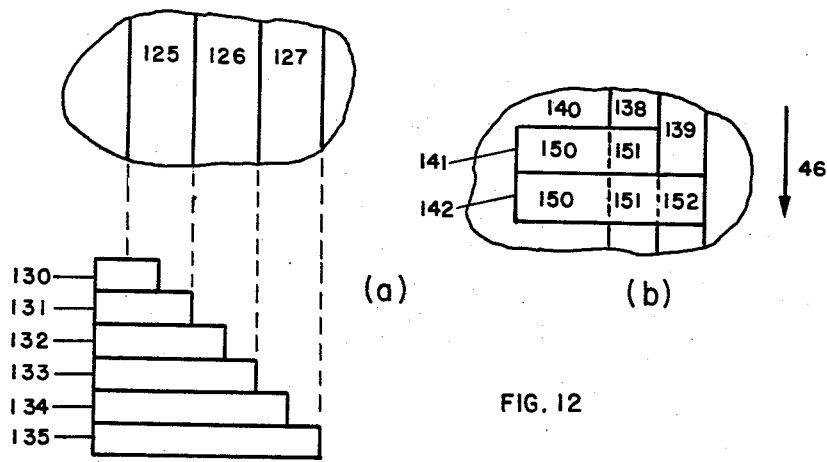
Figure 12:
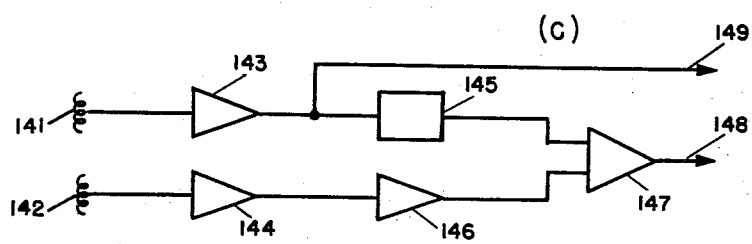

FIGURE 12 illustrates another embodiment in which narrow contiguous tracks can be scanned by detectors wider than the tracks.

Figure 1:
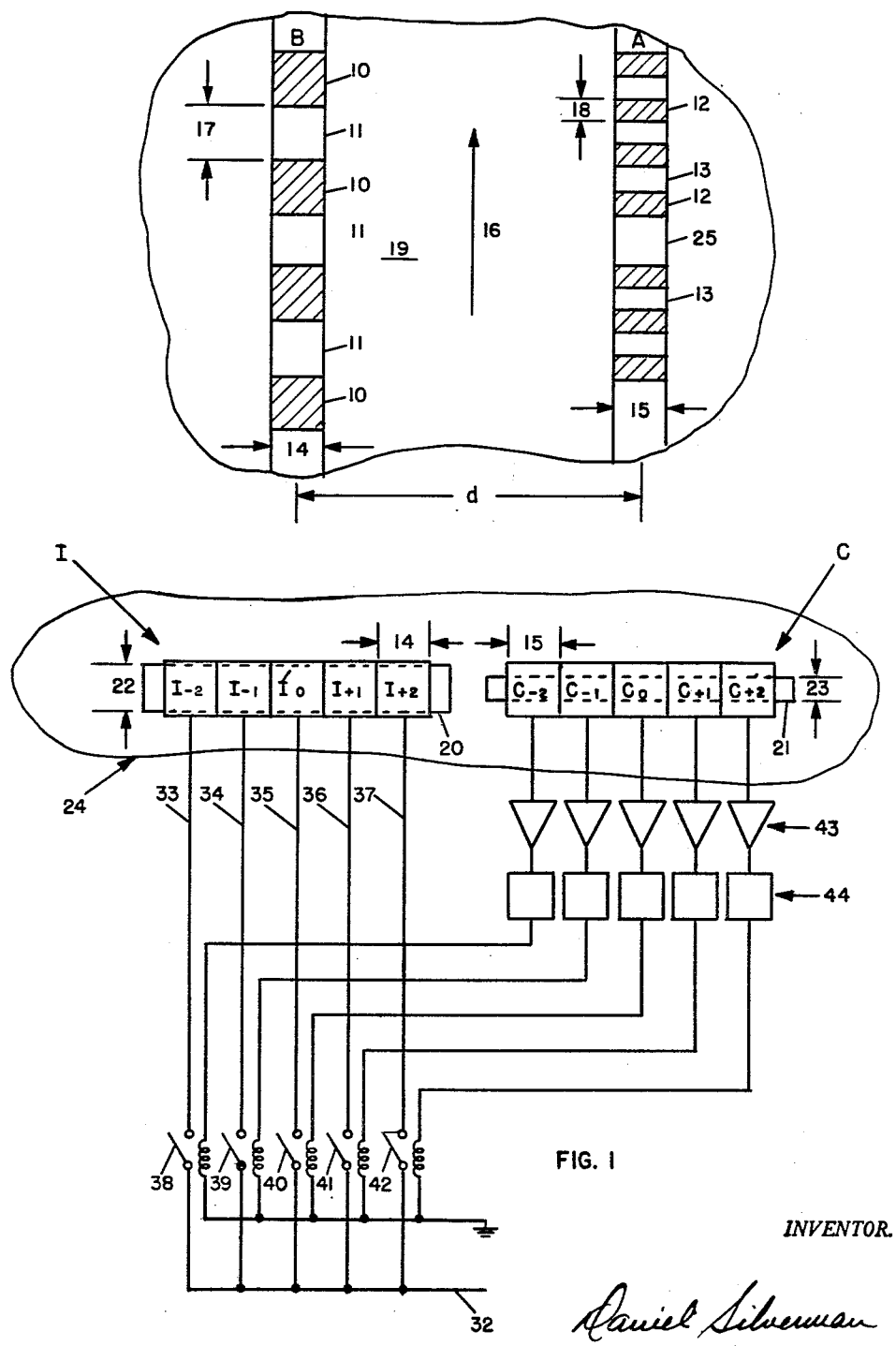
FIGURE 1 shows one embodiment of my invention, showing a portion of a storage record having separate information and control tracks, and corresponding detectors and circuitry.
Figure 2:
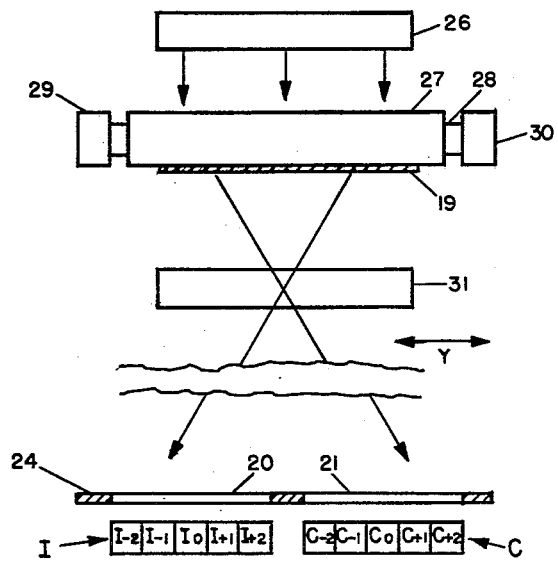
FIGURE 2 is a generalized horizontal section through the scanning system of FIGURE 1.

In FIGURES 1 and 2, I show schematically a portion of an information record 19 in which are shown a multiplicity of information dots, spots, areas, characters, etc. 10 and 11, each with a characteristic property that can be readily recognized by instrumental means. Specific devices are provided for recognizing these properties, which will be called detectors. The detectors may be of any type required to recognize the specific properties of the information characters, such as photoelectric, magnetic, electromechanical, optical, etc., and correspondingly the spots or characters can be placed, printed, or impressed on the record in any one of many ways such as magnetization, photography, printing by press, typewriter, etc., with ink, carbon sheet or ribbon, xerography, or any of the equivalent well-known methods.

The information units 10 and 11 are such that all units or spots 10 have the same properties and spots 11 the same properties, though distinguishably different from those of 10. The spots 10 and 11 are arranged in a column forming a track B of width 14.

On the same sheet 19 is another track A composed of a column of control spots or areas 12 and 13 likewise different in properties from each other. The relative properties of spots 12 and 13 may be different respectively from those of 10 and 11, although for convenience they can be the same. The width 15 of track A is preferably the same as 14 the width of track B, and the longitudinal extent 18 of the spots 12 and 13 may be the same or different from that of 17, of 10 and 11. In FIGURE 1, I have shown the spots 12 and 13 of lesser longitudinal extent than the spots 10 and 11. The spots 12 and 13 represent a control signal which may be substantially steady state in character. However, it is part of my invention to incorporate in the control track (which mainly provides a transverse index), added longitudinal markers or indicia. The spots 10 and 11 represent information which may vary in pattern widely from point to point along the column or track. The spacing between tracks is $d$ and the record moves with respect to the scanning heads or detectors in the direction 16, parallel to tracks A and B.

I show schematically a group of information detectors I and a group of control detectors C arranged in a linear array substantially perpendicular to the longitudinal direction 16 of the tracks A and B. The groups of detectors I and C have the same number of detectors. These preferably are, in width, the same as that of their respective tracks and thus preferably equal to each other. The centers of the groups are spaced apart a distance $d$ the same as that of the tracks, so that in the nominal position of the record 19, the center detectors $I_0$ and $C_0$ fall directly on their respective tracks.

A mask 24 (FIGURE 2) is provided between the record 19 and the detector heads, which (for a photoelectric detector system, for example) would be an opaque sheet with horizontal transparent slits 20 and 21 of widths 22 and 23, respectively, related to the longitudinal dimension of the corresponding spots on the respective tracks. The detectors can, of course, be larger in longitudinal extent than the slits.

In FIGURE 2, I show a partial horizontal section through one possible embodiment of a scanning system for the record 19. This comprises a light source 26 arranged to illuminate the back surface of the record 19. The record is traversed in a direction perpendicular to the plane of the drawing by motor drive means not shown and is guided by means of roller 27 mounted on shaft 28 and journaled in bearings 29 and 30. This roller 27 is below the plane of the drawing and serves to guide the record 19 in a direction perpendicular to its plane, but cannot provide precise guiding of the record in a direction parallel to the axis of the roller. It is the lack of precise control of the position of the record in a direction transverse to its longitudinal motion that causes trouble in the normal scanning system, as is fully described in my Patent No. 2,820,907, and it is precisely this trouble which this present invention is designed to cure.

The back-lighted record 19 is imaged by means of optical system 31 onto the mask 24. Behind the slits 20 and 21 are the detectors I and C. As the strip record is traversed in a direction perpendicular to the slits 20 and 21, bright spots of light coresponding to the information and control signals will be momentarily impressed on the detectors I and C. For the nominal position of the strip 19 the bright spots will fall respectively on $I_0$ and $C_0$. As the strip moves transversely, in the direction Y, the spots of light will fall respectively on $I_{+1}$, $C_{+1}$, or $I_{+2}$, $C_{+2}$, or $I_{-1}$, $C_{-1}$, or $I_{-2}$, $C_{-2}$, depending on the actual position of the strip. I have shown for simplicity only 5 detectors in each of the I and C groups. It will be clear that as many detectors as desired can be used, depending on the width of the tracks (and of the detectors) and of the total possible excursion of the record strip.

Consider the group of information detectors, I. Any one of them will present a maximum output voltage whenever their track is traversed longitudinally and centered in front of that particular detector. Thus for the condition shown in FIGURE 1, detector $I_0$ will have full output voltage, the others will have zero output voltage. If the record is displaced to the left by one half track width, output will appear (at about ½ maximum) on detectors $I_0$ and $I_{-1}$, and so on. The same applies to the control detectors $C_0$ and $C_{-1}$. Due to this geometry, the control detector with maximum output can be used to indicate which of the information detectors will have maximum output at the same time. Thus, as the record 19 is traversed longitudinally, and as it weaves back and forth transversely, the outputs of the various detectors, I, will vary, but one or another will always have a reading higher than any of the other, and that one can be determined by comparing the outputs of the control detectors and determining which one of these has the highest output.

Now, as is desired, the signal on the information track B is to be detected and placed on the output lead 32. To do this leads 33, 34, 35, 36, and 37, FIGURE 1, are provided from each of the detectors I through relays 38, 39, 40, 41, and 42, respectively, to the output lead 32. By continually monitoring the control detectors C and closing the proper relays 38, 39, etc., a continuous output signal can be provided from the track B irrespective of its lateral movement.

The control detectors C are individually connected to amplifiers 43, and to control circuits 44, and to the coils of relays 38, 39, etc. The control or selector circuits are arranged to provide operating current to the relay coils whenever a particular detector has an output signal equal to a specified fraction of maximum. If the value of the fraction is, say 0.4, then when the track A is covering at least 40% of a given detector and the output signal is at least 40% of the maximum value, the corresponding relay will close and the corresponding I detectors will feed output to 32. There will always be at least one I detector feeding output, sometimes two, but never more than two, for the geometry discussed above. Of course, criteria other than the amplitude of detected signal, indicative of the lateral position of the control track with respect to the control detectors may be used to select the proper relay in the information circuits, as will be evident to one skilled in the art.

This is a completely workable system as shown, but because of the electromechanical relays shown in the I detector output circuits, their operation will be slow. If the objective of the information system is to provide high speed retrieval, the speed of traverse of the record will be high and a rapid switching system will be required. There are many well-known methods in the art, using vacuum tubes, cathode ray tubes, or solid state devices for doing switching of this sort, such as the many types of gated amplifiers available on the market. Since these particular circuits do not form a part of my invention, and since the embodiment of FIGURE 1 fully illustrates the principle, no further circuit embodiments will be described, and the term "relays" will be used to mean collectively all such types of electronic, or electromechanical switching devices.

In FIGURE 1, I show the control track A comprising a multiplicity of control spots 12 and 13. These provide substantially a steady-state signal. However I have shown spot 25 of different size and character than 13. This spot can be readily detected and will serve as a marker or longitudinal index. This index can be used for a number of purposes. For example, it can be used to disable the control circuits, described in connection with FIGURE 1, or it can be used to initiate other types of controls; it can signal the beginning or the end of a character, word, phrase, etc., in the information track; it can signal the beginning and/or end of a track, for example, on a short strip or micro-card. It is thus an important part of my invention to provide both transverse and longitudinal indicia on the record. The longitudinal indicia can be incorporated in the control track (which is the transverse indicia), or it can be similarly incorporated in the information track.

Also, as fully explained in my Patent No. 2,820,907, it is important that the control track, or transverse indicia be located accurately with respect to the track B. That is, they must be spaced accurately apart within a possible error which is small compared to the width of the track. To do this, especially for the case of very small size spots of information, it is preferably desirable to print, mark, or impress on the record 19, both information and control spots without moving the record. Since for the type of pattern of spots shown, the printing of the spots will be done sequentially, the record must be moved longitudinally. However, the associated spots of information and control must be printed within a time interval during which the record (although possibly traversed longitudinally) must be prevented from moving a distance, in a transverse direction, which is more than a small fraction of the width of the tracks. Within this limitation of transverse movement, even though the time interval may be substantial, it will be said that the printing of the associated information and control spots will be "substantially simultaneously."

The normal signal printed in the form of spots on the control track A, is preferably a steady state signal (except for possible intervals 25 as longitudinal indicia). This steady state signal is preferably A.C. since this type of signal can be easily detected and amplified. However, it can also be a D.C. steady state signal, or it can be a combination of the two. In any case, it is desirable for the control signal to have a particular distinguishable character by which it can be recognized. Thus, for example, if the record 19 has a multiplicity of groups of tracks B, D, and E, etc., of FIGURE 3, each with their control track A, the particular identifiable character of the control signal from track A will permit rough register of the scanning ssytem with a particular *group* of tracks.

Figure 3:
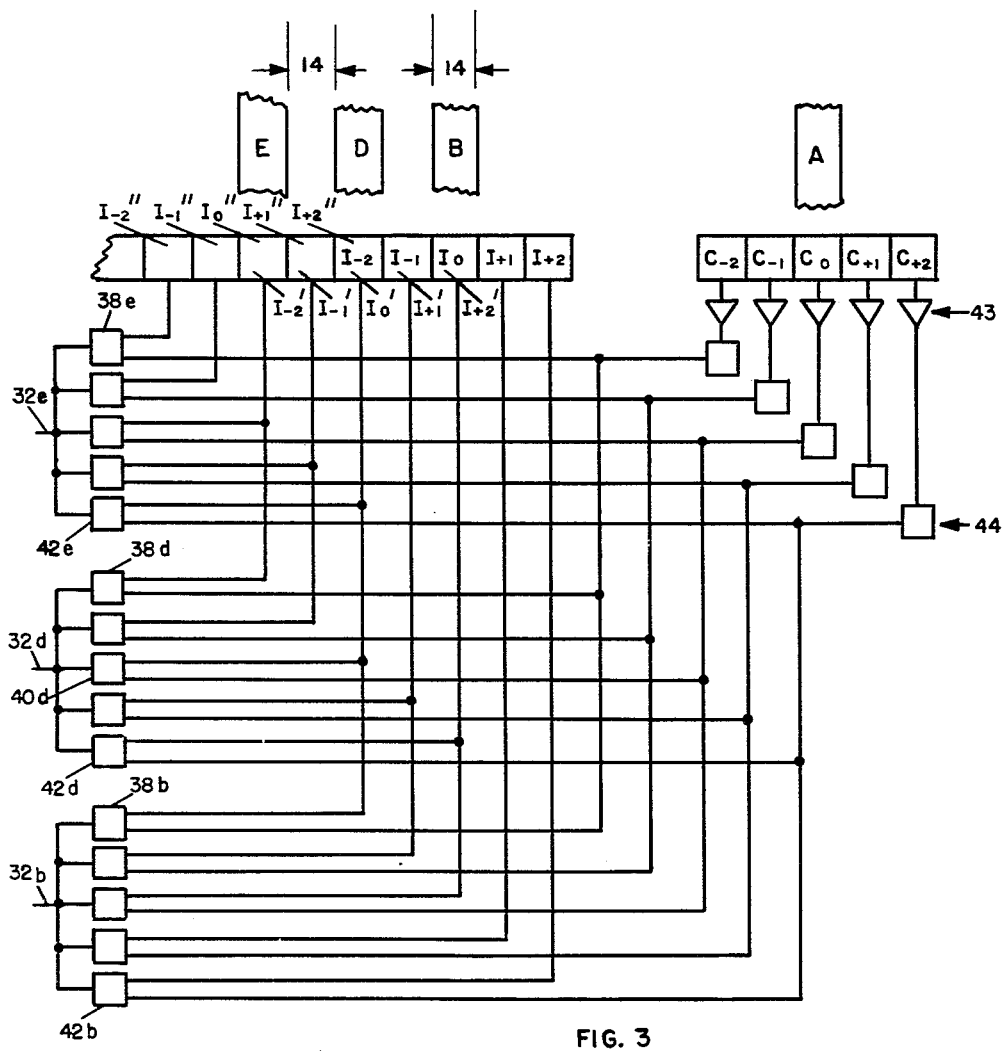
FIGURE 3 is an embodiment similar to FIGURE 1 in which a multiplicity of information tracks are provided on the record.

In FIGURE 3, I show an extension of the embodiment of FIGURE 1 in which three information channels B, D, and E, are shown on the record. The same single control channel A is used as in FIGURE 1. Information channels B, D, and E, are alike in that they are made up of columns of information spots, points or areas 10 and 11 (as in FIGURE 1) which are alike and have the same relative properties in the three tracks. Each track has the same width 14, and the width of clear space between tracks is also 14. Since the width of the detectors is also 14, when a detector is lined up on one track, each track will have a detector lined up, as also will a control detector be lined up on the control track. Also information detectors will be lined up on the intertrack spaces.

In FIGURE 3, it will be seen that the information detectors $I_0$ and $I_{-1}$ will be shared by tracks B and D, and $I_{-2}$ will be shared by tracks B, D, and E, etc. Thus compared to FIGURE 1 there will be a more efficient use of detectors. For M tracks and N control detectors, the total number of information detectors, will be $2M+N-2$.

It will be seen that output leads from $I_0$ and $I_{-1}$ will have 2 branches going to separate relay units, connecting to output lines 32b and 32d. Detector $I_{-2}$ will be connected, through three branches to three relays 38b, 40d, and 42e, leading respectively to output leads 32b, 32d, and 32e. This is quite satisfactory since only one of those three possible relay units will be closed at a given time since they are respectively controlled by control detectors $C_{+2}$, $C_0$, and $C_{-2}$. Since only 2 (at the most) adjacent control detectors can have output at one time, and thus only 2 (at the most) adjacent relay units tied to one bus can be closed at one time, track E will always be connected to 32e, track D to 32d, and track B to 32b, irrespective of the lateral movement of the record with respect to the detectors (within the limits of the lateral extent of the control detectors).

Of course, any number of tracks B, D, E, etc., can be used, provided only that they are accurately spaced from each other and from the parallel control track A, and the detectors are also accurately positioned with respect to the tracks. The precision of placement of the separate tracks must be within a distance which is a small fraction of the width of the individual tracks.

I have shown as an example in FIGURES 1 and 3, the case where the detectors I and C are photoelectric devices. When the record strip is illuminated and an enlarged image is impressed on the pattern of detectors, the width of the track image can be large enough that commercially available photoelectric devices can be used directly in the array. However, if they are still too large, light pipes can be used to lead from the small detector positions to the larger detectors.

With other types of detectors, for example, with magnetic units, the equivalent action of optical enlargement will not be possible and the track spacing, if the full benefits of this invention are to be had, will be too small to fit standard magnetic heads. Thus, the heads will have to be staggered in some way, such as, in echelon along the record, as shown in FIGURE 4. Here I show the same tracks A, B, D, E, etc., as in FIGURE 3. The width 45 of the detector unit, is greater than the width 14 of the track and of the sensitive element of the detector (shown by the cross-hatched area 46). In order to have one detector centered on each track and on each space between tracks, the adjacent information detectors I, must be spaced along the longitudinal direction a distance 47 equal to the longitudinal dimension of the detector assembly. Thus to provide a group of N detectors for the control track or for each of the information tracks, the assembly of sensitive elements will extend for a minimum length of $(N-1)$ (dimension 47). The control assembly will comprise the elements $C_{+2}$, $C_{+1}$, $C_0$, $C_{-1}$, and $C_{-2}$, as before.

In the principle of this control system it is necessary that when a given track covers part of each of two adjacent detectors, the signal being detected by the two adjacent detectors must be in-phase, so that as the track moves horizontally, the signal from one detector will decrease and that from the adjacent detector will increase, maintaining substantially the same total sum signal.

When the detectors are spaced longitudinally along the track, the two adjacent detectors will not have the signal in the same phase. The lowest detector will receive its signal before the one on its right, and that before the one on its right, etc. Thus the signal from $C_{-2}$ leads the signal from $C_{-1}$, which leads the signal from $C_0$, etc.

To accomplish the principle of this invention it is necessary to get these signals in-phase, which can be done by means of time delay means connected to the outputs of the detectors. If the velocity of the tape is V and the spacing along the tape of the adjacent detectors is X, there will be a time difference between the times of arrival of the track signals on adjacent detectors of $T=X/V$. Thus time delays of T second are necessary between adjacent detectors. These can be provided in a number of ways, such as by magnetic recording or electrical networks, or other means. I prefer to use electrical networks.

In FIGURE 5(a), I show the control detectors, $C_{-2}$, $C_{-1}$, etc., with appropriate numbers of delay units K, each of delay time T. The signal on the junction 48 between the first and second delay units on detectors $C_{-2}$ will be in-phase with the signal from $C_{-1}$. The signal on 49 will be in-phase with the signal on 57, which will be in-phase with the signal on $C_0$, etc. The terminals 51, 52, 53, 54, and 55, will all be in time phase with respect to each other. So far as this group of detectors are concerned, the terminals of the array can be considered to be 51, 52, 53, etc., instead of $C_{-2}$, $C_{-1}$, etc., as in FIGURE 3.

It will be clear that if the direction of movement of the record sheet 46 (FIGURE 5b) is opposite to 16 that assumed in FIGURE 5a, detector $C_{+2}$ will then lead all the others in signal phase and so the 4 units of delay will be in series with this detector, 3 in series with $C_{+1}$, etc., to provide the five terminals 58, 59, 60, 61, and 62, all having signals in-phase with each other as the track lines up with each of them in turn. Thus, if the record sheet is permitted to move in either direction, either two sets of delay units will be required, or the same set may be switched from the configuration shown in FIGURE 5(a) to that shown in FIGURE 5(b), as will be understood by one skilled in the art.

As shown in FIGURE 5(c), the delay units in series with those information detectors which serve two or more output lines 32b and 32d, etc., can serve equally well for the two systems. The terminal 63, for example, is connected through two delay units to the relay unit 40b and output line 32b, while it connects directly to the relay unit 42d and thus to output line 32d.

The embodiment shown in FIGURES 4 and 5 is only one of many possible geometrical arrangements that can be used. For example, the detectors can be set in a staggered or zig-zag pattern, or arranged in any other geometry, with a corresponding arrangement of delay units. Some of these other patterns might have a fewer (total) number of delay units, and thus might be more efficient from that point of view. The geometry shown in FIGURES 4 and 5 simply illustrates one arrangement, and is not intended to limit in any way the number of possible arrangements.

I have pointed out above that the control track should preferably have a particular identifiable character, and that the control track should be accurately placed with respect to the information track. I have shown the signal character of the control track A as different from that of the information track B, FIGURE 1, with the control signal preferably steady state, A.C. and of higher frequency than the information signal. However, this is not essential, and with proper design of the amplifier 43 and control means 44, it is possible to use the information track as a control track. This eliminates the problem of the alignment of the two tracks and of the two sets of detectors.

One possible embodiment in which the same single information track is used both for control and information is shown in FIGURE 6. Here the information track is B and both sets of detectors C and I are aligned with the track. For convenience the direction of traverse of the record 19 is shown by the arrow 46. Two mask slits are again provided, one for each group of detectors. For the condition shown, signal will appear on one or two of the control detectors, and at some later time, the same signal will appear on the information detectors. As in FIGURE 1, the outputs of the control detectors go to the amplifiers 43 and control means 44. The latter are connected respectively to switch means 38, 39, 40, 41, and 42, connected in the leads 33, 34, 35, 36, and 37, respectively, from the information detectors to the output lead 32. The operation is similar to that of FIGURE 1, except that the elements 43 and 44 must be adapted to utilize the normal information signal. This presents no insurmountable problems.

Going one step farther, I show in FIGURE 7 a similar situation to that of FIGURE 6 except that I have eliminated one set of detectors. Thus with one set of detectors, I provide two leads from each detector. One lead goes to the appropriate amplifier 43 and control means 44. The other goes by way of leads 33, 34, etc., to the switch means 38, 39, etc., and thence to output lead 32. The output of the several control means 44 go to the appropriate switch or relay means 38, 39, etc., as before.

In series with the leads 33, 34, 35, 36, 37, I show delay units Z. These might be in the form of transmission line type signal delay units, or similar devices. Although these delay units may not be necessary, it may be desirable to use them. The purpose of the delay units is to delay the information signals by a time equal to the time delay of the control signal through elements 43 and 44. Since the rate at which the record 19 can be moved from side to side is slow compared to the rate of scan of information spots, the time constant of the detector networks 43 and 44 should be no longer than the period of one information spot and preferably longer than several such spots. However, this time constant should be short compared to the period of the transverse motion of the record 19. Since it is desirable, though not essential, that the control obtained from a given instantaneous control signal be applied to the corresponding information signal, I prefer to delay the information signal by approximately the same amount as the delay of the control circuits 43 and 44. However, since the latter delay, or time constant is short compared to the period of the transverse movement of the record, this precision of timing may not be essential, and the delay units Z may not be essential.

This method of using a single track for both information and control is quite satisfactory when there is only one track. However, this rarely occurs in practice, for even though there is only one channel of information recorded on the record, there will in general be additional substantially parallel tracks, perhaps comprising part of the same signal track at different intervals of time. Where there are multiple information tracks, as in FIGURE 3, for example, the clear control signal that comes from track B of FIGURE 7 or track A of FIGURE 1 is not available and some means must be provided to distinguish the particular character of the control signal. One possible situation is illustrated in FIGURE 8. I show a multi-track record in which information signal is recorded in tracks 71, 73, 75, 77, etc. In the intertrack spaces 72, 74, 76, etc. are provided a signal distinguishably different from these on the information tracks. In this sense, the inter- (information) track spaces are utilized as control tracks. The signals in the control and signal tracks must be distinguishably different so that when they both appear on one detector, as when one detector overlaps two tracks, they can be separated by means of electric circuits; the control signal being used for control purposes and the information signal being sent to its proper display circuit. Control tracks 72 and 76 have a high frequency steady state signal. This should be high enough frequency to be easily separated by means of filters from the lower frequency signal from the information channels. Also since it will be a single frequency signal, a sharply tuned filter will serve to separate it from the information signal. Intertrack spaces 74 and 78 are provided with a steady state (D.C.) signal (zero signal). This is all illustrated in FIGURE 8(a).

Each of the detectors 79, 80, 81, etc., has an amplifier connected to its output and a series of filters separating the D.C., high frequency (HF) and low frequency (LF) components. In lines (b), (c), and (d), I show the magnitude of the HF signal from the separate detectors. The separate detectors 79, 80, 81, etc., are shown lined up with the corresponding tracks 70, 71, 72, etc., in line (a). Only detectors 81 and 85 show high frequency output as in (b). In line (c), I have shifted the record ½ track width to the right with respect to the detector array as shown by the arrow 90 which shows the position on the detector array of the arrow 88 on the record. In line (c) the high amplitude signal on detectors 81 and 85 has been reduced to ½ value. All other detectors still show zero HF signal. When the record moves ½ track width to the left, instead of to the right, as shown by the arrow 91 line (d), the HF signal in tracks 81 and 85 again reduce to ½ value, but now the signals on detectors 80 and 84 increase to ½ value, instead of detectors 82 and 86.

At the same time, the information signal on track 73, for example, which was detected entirely on detector 82 only (as shown in line (e)), is now recorded on both detectors 82 and 83, as the track 73 moves from detector 82 toward detector 83. A similar situation exists when track 73 moves to the left towards detector 81, as shown in line (g). In lines (h), (i), and (j), I show respectively the D.C. signal on the various detectors as a function of the three positions of the record 19.

It will be clear that several patterns of outputs on lines (b), (c), (d), or (e), (f), (g), or (h), (i), (j), either taken alone or in combination with each other will provide a clear indication of the relative position of the record and the detector array. For example, we can take the ratio of HF signal on detector 81 to that on detector 82, and the ratio of HF signal on detector 81 to that on detector 80. When these two ratios are very high, track 72 is centered opposite detector 81 line (b). When ratio 81/82 equals unity and ratio 81/80 is still high, line (c), track 72 is centered between detectors 81 and 82 and thus detectors 82 and 83 should both be connected to display track 73 signals. Going further in the same direction when ratio 81/82 equals zero, then track 72 will be opposite detector 82 and detector 82 should be disconnected from the output, leaving detector 83 alone to display information signal from track 73. Or, more simply, the magnitude of the HF signal on the detectors can be used to indicate which information detector is to be connected to which display circuit.

In a similar manner, the D.C. signal or the LF information signal itself can be used to indicate the relative position of the record and detector array. More complicated control track designs and control circuitry can be provided as required to ensure that correct switching of the outputs of the detectors will be made to keep the signal on each track in its proper display circuit irrespective of the lateral movement of the record.

The above explanation in conjunction with FIGURE 8 is based upon the availability of one track (whether information, or other) that has a characteristic signal that can be separated and identified, and thus used as a control signal. There should preferably be only one such track within the range of the control detectors (or information detectors being used as control detectors) to avoid confusion as to which track the control is being taken from. However, even where there is no characteristic signal on any track, it is possible to use any information track as control.

This is illustrated in connection with FIGURE 9 in which the tracks B, D, and E, are similar to those in FIGURE 3, and information detectors O, P, Q, R, S, U, and W, are provided. Consider that detector R is to be used as the control detector. By means of leads 96, 97, and 96, the detectors Q, R, and S, are connected to ratio devices 92 and 93. 92 measures the ratio of the outputs R/S and S/R and 93 measures the outputs of R/Q and Q/R. Also I show connected to these three detectors Q, R, and S, two correlation means 99 and 100. These can be any of the many types of cross-correlation devices on the market today. Or it can be as simple as a multiplier taking the outputs of the detectors to which they are connected, multiplying them together and averaging the outputs. This type of device is well known in the art.

For the cases where the tracks are lined up with different detectors, the values of ratios and correlation coefficients are shown in the following table. The rough values of ratios R/S and S/R and R/Q and a Q/R are shown in the table as are the magnitudes of the correlation coefficients. Case I is for the condition where tracks B, D, and E, are lined up with detectors U, R, and P, respectively. For Case II, track D is picked up on detectors R and S, E on P and Q, and B on U and W, respectively. The ratios R/S and R/Q are different from what they would be if only track D was being detected (as in FIGURE 1) or a control track was available. Now all detectors carry signal of the same general character, and the problem is to tell whether the signal originally on detector R, for example, is now shared with detectors S or Q. The important point is that detectors R and S carry the *same* signal and Q carries an entirely different signal, thus the correlator 99 output, giving the correlation coefficient of R and S, both of which have the same signal, will be high, whereas the correlation between R and Q, which carry different signals will be low. Thus the correlation coefficient can be another parameter, indicative of the position of the tracks with respect to the detectors. Case III indicates the further movement of the record to the right until track D lines up with detector S. A similar analysis can be made for comparable movement of the record to the left with respect to the detectors.

| Case | I | II | III |
|---|---|---|---|
| Ratio R/S | High | 1 | 0 |
| Ratio S/R | 0 | 1 | High |
| Correlation R to S | 0 | High | 0 |
| Ratio R/Q | High | 1 | 0 |
| Ratio Q/R | 0 | 1 | High |
| Correlation R to Q | 0 | Low | 0 |

Case I—Track D lined up with detector R.
Case II—Track D lined up with detectors R+S.
Case III—Track D lined up with detector S.

The same analysis provided in the table can be carried out for wider movements of the tracks with respect to the detectors. In any case, provided enough parameters are used, it is possible to control the switching of detector outputs to provide continuous signals on specified lines, from each of the several tracks, irrespective of record movement. This can be done with a control track separated from the information tracks as in FIGURES 1 and 3, or mixed in with the information tracks as in FIGURE 8. Or the information track can be used for control as in FIGURES 6 and 7. It will be clear also that if information signal of one type is placed on tracks B, D, and E, of FIGURE 9, information of another type can be placed in the intertrack spaces H, I, J, etc. These two signal types must differ sufficiently so that the resulting detector outputs (when both signals are present) can be separated into the component signals. This separation can be done by means well known in the art, such as by optical or electrical filtering, correlation, demodulation and similar techniques.

Within this limitation of signal character it is possible to greatly increase the number of information tracks at little increase in cost. Also, by using signal characteristics such as color (for optical recording and retrieval) or by combining photographic and magnetic recording, the number of separate signals that can be recorded on a given information track can be doubled or tripled.

Consider the situation that arises where the tracks are continuous (where, for example, the pattern of spots to be detected is a picture—say of a letter or number). Except for the case where the tracks line up exactly with the detectors, there will be two tracks recording on each detector. Thus the criteria for selecting one detector or another for recording a given track, are multiple and complicated. However, at the cost of increasing the number of detectors (and switches) this situation can be simplified materially.

In the case illustrated in FIGURE 10, there are three contiguous tracks 103, 104, and 105. The corresponding detectors 106–112 inclusive are each equal in width to half the track width. Thus each track will record on either two detectors or three detectors. If recording on two detectors each of the two has only one signal, that of the track in question. If the record is displaced slightly, then the track (for example 104) will record on detectors 108, 109, and 110. But 108 will also record from track 103 and 110 will also record from track 105. Detector 109 will have only the signal from track 104 and can be switched to the output display for that track.

The situation in FIGURE 10 is similar to that of FIGURE 3, if the track and dead intertrack space adjacent are considered as one track. So by doubling the number of useful tracks (by recording information in contiguous tracks) and by doubling the number of detectors, each of which is equal in width to half the width of the track, there will always be at least one detector that carries the signal of *only one* track. Thus the problem of separating (in the detector output) the signals from adjacent tracks is obviated. Of course, if the signals on adjacent tracks can easily be separated, as, for example, where they are basically of different frequency, or where they are printed on the record in different color, or if one track is magnetic and the other is optical, then the efficiency of storage is increased by having the tracks contiguous and as narrow as the narrowest sufficiently sensitive detector.

Another way of looking at this control process is to consider the edge detectors of a group of detectors as indicators of the position of the track or tracks. For example, consider the case of the control track of FIGURE 1. The control amplifiers 43 and the control means 44 serve to determine which of the control detectors have the highest output (that is, which detector or detectors are opposite the control track). Instead of looking for the highest output among the control detectors, we can do the reverse, namely, analyze the outputs for those with the lowest output, or those with output less than some specified value, say 10% to 25%. This would eliminate signals due simply to noise on the record. Eliminating those detectors with output less than this value leaves the one or two detectors which are actually reading signal from the track.

The same principle can be applied to a group of information detectors which are scanning a multiplicity of tracks. When the tracks are centered over the array of detectors, there will be detectors on both sides of the array which have no signal. Assume, as in the case of FIGURE 3, that there are 5 detectors for each track. There will then be two information detectors on each end of the array that have no signal. If all four of these have no signal, it will be clear that the tracks are centered over the detector array. If three on the right and one on the left have no signal, then the tracks have moved one space to the left. If two on the right and one on the left have no signal, then the tracks have moved only ½ space to the left. By this simple logic it can be determined where the tracks are, and which information detectors should be connected to the display. This type of analysis can hold only if there is signal on all tracks at all time. This may require that on the outside information tracks, a control signal be placed whenever information signal is not being recorded, so that there will be signal of some sort on those tracks at all times. Also, it is possible to place on the record a control track on each side of the group of information tracks. Then by detecting these control signals on the outside detectors, the relative position of the tracks and the detectors can be determined.

In the use of a record sheet carrying information tracks of different properties, one important combination arises in the use of magnetic and photographic recording. Because of the possible use of optical magnification, the photographic method of storage has the advantage of greater density of storage. On the other hand, to counteract this important benefit, is the lack of flexibility of storage. In other words, the permanence of the photographic recording is a disadvantage in many problems and the erasable nature of magnetic recording is used in spite of its low density of storage.

There are many applications for information storage that can use a combination of non-erasable and erasable storage. An example of this is the case of inventory control where much of the information stored is of a permanent nature, such as names and descriptions of items, their physical location in storage, etc. Information such as the current quantities of each item, of course, is of a temporary nature, and some form of erasable storage is best for storing this information. The availability on a single record of both permanent and erasable storage is a distinct advantage, and is not available in any of the information recording systems available today.

In FIGURE 11, I show one embodiment of a combination permanent and erasable storage medium. The record medium 19 is a sheet or strip of plastic 19 on which has been impressed, painted, or printed, as, for example, by a rotary press, a multiplicity of longitudinal lines of magnetic ink 113, 114, etc. These are thin layers of magnetic particles held in a drying carrier medium, as is well known in the art. By printing them, the lines can be as narrow as desired, and as is consistent with getting sufficient signal return. By printing the lines of magnetic material, a minimum area of the record strip is covered by opaque material, thus permitting more area for photograph recording.

The advantages of a multiplicity of printed lines of magnetizable material on the record as compared to the use of a full covering layer of magnetic material, are several: As indicated above, where it is desired to have both a permanent and an erasable storage on the same record, the printed lines (tracks) permit more area for the printing of non-erasable storage. The use of multiple lines of magnetic material permits the use of more independent tracks in a given space on the record, and thus a higher density of storage. With a printed line, the magnetic width of the track can be made smaller than the width of the magnetizing head, whereas if the track is formed by the magnetizing of a layer of material, the width of the track will be greater than the width of the head, due to magnetic fringe flux from the head. Thus the use of a printed line permits a higher density of magnetic storage, and also a greater density of combined magnetic plus permanent storage. It will be clear, of course, that the permanent storage can be impressed on the record in any of many possible ways, as desired, such as by printing, xerography, photography, or other means. Of course, photography lends itself best to this type of application.

The magnetic tracks will be detected by magnetic detectors 115 and 116. Since it is not possible to use as high a track density for magnetic storage as for photographic, the magnetic detectors can be large compared to track width. If the spacing of magnetic tracks is determined on the basis of transverse movement of the record strip, one can use a width of detector, 115, for example, which is greater than the range of transverse movement of the record. In that case, track 113 will always record on detector 115, track 114 on detector 116, etc.

The plastic strip with magnetic ink imprinted is then handled like a base plastic for a photographic strip, coated with photographic emulsion, etc. The printing of the magnetic lines can be done after the photographic emulsion is applied, but this would all have to be done in the dark. In any case, the printing of the magnetic lines is preferably done before the photographic strip is exposed to provide the optical information tracks.

In the photographic recording on the strip, it is necessary to align the strip with the photographic apparatus so that the photographic tracks 117 and 118, etc., are clear of and accurately spaced with respect to the magnetic tracks. A free space 124 may be provided without storage for possible misalignment of the magnetic and photographic tracks, if necessary. However, this decreases the amount of information stored and precise alignment of the tracks is desirable which obviates the need of the spaces 124. In retrieval from storage, the record, or an image of the record is presented to an array of optical detectors 121, 122, 123, etc., as explained in connection with FIGURE 3. The relative (longitudinal) position of the optical detectors 121 etc., and magnetic detectors 115, etc., can be chosen for convenience, and the corresponding information stored on the strip in a corresponding relative position.

If more magnetic storage (relative to the photographic storage) is required, the printed magnetic lines can be spaced closer together. If the spacing is less than the expected excursion of the strip, then multiple magnetic detectors must be used to record from the tracks as described in connection with FIGURE 4. In any case, the narrow printed track permits a higher density of combined magnetic plus photographic storage than if the magnetic track is derived from the magnetic gap of the recording head acting on a wide coated area of the strip.

The details of the printing of the magnetic tracks and the sensitizing of the photographic surface can be varied in accordance with the art. Also, the magnetic tracks can be printed after the film strip is prepared. The magnetic tracks can also be impressed on the film strip xerographically. The important thing is, however, that for maximum efficiency of storage the magnetic and photographic tracks must be carefully aligned and this is most easily accomplished if the photographic tracks are recorded after the magnetic tracks are printed.

The magnetic tracks will be parallel and will define a (relatively) wide space within which the photographic tracks are to be recorded. By using means, such as described in my Patent No. 2,820,907, comprising an optical servo responsive to the optical position of a selected magnetic (opaque) track, and a mirror (for example) controlled by this servo, the optical beams which are *recording* the optical tracks can be deflected, as necessary, to be properly placed with respect to the magnetic tracks. It is also possible to print the photographic tracks and then to print the magnetic tracks This can be done by using an optical servo responsive to one of the optical tracks, and to have this servo position the *strip* so that the magnetic track will be aligned with the photographic track. Although this two step printing of optical and magnetic tracks can be done in either order, it will be clear that the highest precision can be obtained by first printing the magnetic tracks and then the photographic, and this I prefer to do. In both cases, I envision using the first recorded tracks as indicia to properly align the second recorded tracks. The most preferred embodiment would be to print the magnetic lines simultaneously with the printing of the photographic information tracks.

Another embodiment of this invention is to use a conventional plastic sheet or strip coated with magnetic material on one side, and coated with photographic emulsion on the other side. In this way the full area of the record can be used for both photographic and magnetic recording. This requires the use of optical retrieval based on light reflected from the record, which is inherently less satisfactory than that using transmitted light. Also, the double surface coating prevents the use of micro-photographs to be used as part of the storage since they are best retrieved by transmitted light. In spite of this, however, the greater density of erasable magnetic storage to go with the permanent photographic storage may justify the poorer optical system.

If the use of reflected light for retrieving the photographic information is satisfactory, then a storage record can be used comprising an opaque plastic strip, both sides of which carry a photographic emulsion plus printed magnetic lines. Also, two thin strips of plastic, each having emulsion plus magnetic printed tracks, can be fastened back to back to provide a similar assembly. Or two strips, one with magnetic lines or magnetic layer, plus a film or paper with photographic emulsion, can be mounted back to back.

In FIGURE 4, I show a three track magnetic record with tracks B, D, and E, and corresponding intertrack spaces of width equal to the track width. In FIGURE 12(a), I show three *contiguous* magnetic tracks 125, 126, and 127. To properly record from these tracks, in accordance with FIGURE 10, would require magnetic detectors of width equal to half the track width. These are difficult to obtain if the width of track is small. In FIGURE 12, I show an embodiment of this invention in which narrow tracks can be recorded with wide detectors.

In FIGURE 12(b) are two contiguous tracks 138 and 139 narrower than the minimum size of detector, 141 and 142. The area 140 has the natural properties of the recording medium (that is, it is not magnetized). Detector 141 will record the magnetic variations over its whole length, including that portion 150 covering area 140 and that portion 151 covering track 138. But since 140 is unmagnetized, detector 141 will record only the magnetic variations in track 138. Similarly, detector 142 will record the magnetic variations in area 140, track 138 and track 139. In other words, detector 142 will have all the signal that shows up on detector 141 and, in addition, the signal from track 139. Now, if we subtract the signal on 141 from that on 142 (taking proper account of the time delay of the signals) then the difference will be the signal on track 139.

In FIGURE 12(c), I show the detector heads 141 and 142 going to amplifiers 143 and 144, respectively. Since for the direction of record movement 46 shown in (b), signal on 141 will lead that on 142, the signal on 141 is delayed by delay means 145. The signal on detector 142 is inverted by the phase inverter 146 and the two signal outputs now in time coincidence and opposite electrical phase are introduced into the summation amplifier 147. The output lead 148 carries the difference signal, namely the signal on track 139. The line 149 carries the signal from detector 141, on track 138. By continuing this process, with heads 130, 131, 132, . . . 135, etc., FIGURE 12(a), the equivalent of six detectors, each of half track width can record the signal on tracks 125, 126, and 127, respectively.

While the principle has been described in connection with magnetic recording, where it is most useful in view of the large physical size of magnetic detectors, it can be applied equally well to other types of detectors.

In my Patent No. 2,820,907, the transverse indicia are utilized in conjunction with servo means to position the record, or an image of the record, into register with the scanning system. In this present invention the control track and the control detectors can be utilized in a similar manner to provide a signal which can be used with appropriate control means to position the record or an image of the record. It is not my purpose to use this type of mechanism to provide *accurate* register between the record and the scanning system (as in the case of my patent), since it is the principal objective of this present invention to obviate the need of accurate register. However, in those cases where a multiplicity of parallel *groups* of tracks are provided on the record and the scanning system is provided with sufficient detectors to handle only *one group* of tracks, it is essential that the record (or image thereof) be roughly positioned with respect to the scanning system as one group of tracks, or another, is to be scanned. It is therefore an important part of my invention to provide rapid electronic control of the scanning system for small deviations of the record from its nominal position with respect to the scanning detectors, and also to provide means such as described in my patent to provide slower electromechanical control of the rough register, for wide range deviations of the record, and for selecting any one of a multiplicity of groups of tracks for scanning.

It will be clear from my description of the several embodiments of my invention that there are many possible embodiments and combinations of embodiments that can be used to illustrate the principles of my invention. For example, there may be a single information channel and a single control channel, each having a multiplicity of detectors as in FIGURE 1. Having one control track and detectors, it is possible to use a multiplicity of information tracks with consequent saving in information detectors as in FIGURE 3. Where there is only one information track it is possible also to use this track as a control track as well, as in FIGURE 6, and also to use the information detectors as control detectors as in FIGURE 7. Where there are a multiplicity of information tracks, one of the information tracks can still be used as a control track as in FIGURE 8, where it carries a particular character of signal. Or, as in FIGURE 9, it is possible to use any information track as a control track, and even have all tracks and intertrack spaces carry information, provided the signals on adjacent tracks are separably different. Also a given record can have information tracks of different physicochemical properties. For example, since magnetic recording heads are generally of substantial dimension, they can be used efficiently, if the intertrack spaces are used for photographic or other information recording. This permits, in addition, the efficient use on a single record of permanent (non-erasable) and temporary (erasable) storage.

Also, I have described my invention in terms of a number of embodiments and have indicated as a preferred arrangement, the provision of the spots of information in linear arrays or columns. However, it is my intention to show that the principle of the invention is equally adaptable to two-dimensional arrays of spots. For example, for the array of spots shown in FIGURE 8, the spots in column 71 can be detected sequentially by detector 80, those of track 73 by detector 82, etc. Also it is equally possible to consider the spots in each horizontal row of the columns, 71 and 73, related to each other and to be read simultaneously by detectors 80 and 82, respectively, sequentially, as the record is traversed past the detectors. Also, by having a multi-row patern of *detectors*, they can simultaneously scan a two-dimensional array of spots on the record. This, of course, requires use of a longitudinal index, as taught in my Patent No. 2,820,907. This two-dimensional array of spots can, of course, be a pictorial array of spots, such as an alphanumeric character. This can be a printed array of spots such as might be printed by an array of points or wires, set in the proper pattern, or it can be a character such as might be printed with type, etc., which can, of course, be considered made up of a multiplicity of tiny squares, some black and some white, arranged in a grid. By the use of this type of scanner, it should be possible to scan and "read" printed characters on documents without difficulties arising from the transverse movement of the record strip. Incidentially, it will be clear from the description elsewhere in this specification that the optical retrieval of information can be done either by light transmitted through the record sheet, or by light reflected from the record sheet. Thus the record can be a photographic film, paper, printed sheet, typewritten document, etc.

Although a number of embodiments of the present invention have been illustrated and described, it will be obvious to those skilled in the art that many modifications, variations, and equivalents of this invention may be made without departing from the spirit and the scope thereof, and therefore only such limitations should be imposed as are indicated in the appended claims.

I claim:

1. In an information scanner adapted to scan and retrieve information from a storage record, said record capable of being traversed longitudinally past said scanner and also capable of wide movement transversely with respect to said scanner, said record comprising a medium having impressed thereon a pattern of spots arranged in at least one column, each of said spots having at least one distinguishable physico-chemical property and representing by said pattern the information recorded on said record, the improvement comprising control means including detector means responsive to the properties of said spots in said column of spots, signal means including detector means responsive to the properties of said spots, switch means connected to said signal means, and selector means connected between said control means and said switch means, said detector means comprising more detectors than there are columns of spots, said detectors arranged transverse to said column, whereby as said record moves transversely over a wide range with respect to said scanner there is always at least one signal detector in scanning relation to each of said at least one column of spots.

2. In an information system, a scanner adapted to scan and retrieve information recorded on a storage record, said record capable of being traversed longitudinally past said scanner, and also capable of being moved transversely with respect to said scanner, said record carry information in the form of a pattern of spots arranged in at least one column of spots parallel to the longitudinal direction of travel of said record, each of said spots having at least one physico-chemical property differing from that of the record medium and capable of being recognized by a detector, the improvement comprising a multiplicity of detectors sensitive to the properties of said column of spots, control means connected to said detectors, switch means connected to said detectors, and selector means connected between said control means and said switch means, said detectors arranged in an array transverse to the direction of traverse of said record, and being greater in number than said at least one column of spots, whereby as said record moves transversely with respect to said scanner there will always be at least one detector in scanning relation to each of said columns of spots.

3. A scanner as in claim 2 in which said multiplicity of detectors comprises a first and a second group, said control means connected to said first group and said switch means connected to said second group.

4. A scanner as in claim 3 in which said first and second groups of detectors are arranged to scan the same column of spots.

5. A scanner as in claim 3 in which said first group of detectors is arranged to scan a control column of spots, said second group of detectors is arranged to scan a column of information spots, said spots in said control column comprise a control signal differing from the signal carried by said information spots, said control column and said information column being parallel to each other to a tolerance which is small compared to the dimensions of said spots.

6. A scanner as in claim 2 in which a specific array of said multiplicity of detectors is connected both to said control means and to said switch means.

7. In a scanning means for the retrieval of information impressed on a record medium in the form of a pattern of identifiable spots, each having a detectable physico-chemical property, said pattern comprising at least one linear array of spots, and means for traversing the said record in the direction of said linear array, said record capable of being moved transverse to its direction of traverse, the improvement comprising a multiplicity of detectors in an array across said direction of traverse, said detectors sensitive to the properties of said spots, a first means responsive to the output signals from said detectors for determining which detector has a signal of predetermined character and a second means responsive to said first means for connecting to an output circuit the detector with the said predetermined signal character, said detectors being greater in number than said at least one linear array of spots, whereby when said record moves transversely there will be at least one detector in scanning relation to said at least one linear array of spots.

8. In an information retrieval device forming part of an information system in which information is stored on a record in the form of discrete areas of said record modified to have specified physico-chemical properties, said areas arranged in at least one column forming at least one information track colinear with the longitudinal direction of motion of said record through said retrieval device, and on which is impressed a control track comprising a column of discrete areas of said record modified to have specified physico-chemical properties, said control track parallel to and spaced from said information track, said record capable of moving transversely with respect to said retrieval device, the improvement comprising a multiplicity of information detectors greater in number than said at least one information track sensitive to the properties of said information track, a multiplicity of control detectors, greater in number than said control track, sensitive to the properties of said control track, said information and control detectors arranged in an array across said tracks, means for moving said record longitudinally so said detectors may scan the properties of said tracks respectively, means associated with said control detectors for continuously measuring the properties of said control areas and displaying electrical signals proportional to the amount of said property being measured by each detector, means for determining which control detector has the highest output signal and means for controlling the individual outputs of said information detectors in accordance with said highest output.

9. In the method of scanning a multi-track information record in which said information is recorded as a pattern of spots arranged in at least two parallel tracks, the improvement comprising detecting the pattern of spots on a first track with a first detector, detecting the pattern of spots on both said first track and a second track with a second detector, subtracting the output of said first detector in proper phase from the output of said second detector, whereby the signal due to the pattern of spots on said second track is obtained.

10. In an information storage system, a scanning means for detecting the signal on each of two parallel tracks in which said information is stored as a sequence of areas of specified physico-chemical properties along said tracks, the improvement comprising a first detector responsive to the signal recorded on a first track, a second detector responsive to the combined signal recorded on said first and a second track, delay means for delaying the output of said first detector, and means for subtracting the delayed output of said first detector from the output of said second detector whereby the signal recorded on said second track is retrieved.

11. In an information system including a storage record comprising a storage medium and a pattern of spots of specific physico-chemical properties arranged in at least two columns of arbitrary but equal width, the space between the columns being substantially equal in width to the width of the columns, the improvement comprising a scanner for said record including a multiplicity of detectors responsive to the properties of said spots arranged in an array across said column, each of said detectors of width equal to the width of said column and at least twice as many detectors as there are columns whereby when one column is aligned with the first detector in said array, an adjacent column will be aligned with the third detector in said array.

12. In an information system including an information record comprising a record medium with a pattern of spots of detectable properties arranged in at least two parallel columns of spots spaced apart an arbitrary distance, and transport means for traversing said record longitudinally past a contiguous array of detectors greater in number than the number of columns placed across the paths of said columns, said transport means permitting lateral movement of said record at least as great as the spacing between columns, the improvement comprising said detectors all of equal width, said width being equal to one-half the spacing between columns, whereby when one column is aligned with the first detector in said array, the adjacent column will be aligned with the third detector in said array.

13. Apparatus as in claim 2 in which said detectors comprise radiation sensitive elements and said spots comprise areas of specific radiation control.

14. Apparatus as in claim 2 in which said detectors are magnetically sensitive, and said spots comprise areas of specific magnetic properties.

15. Apparatus as in claim 2 in which said array of detectors placed transverse to said column of spots includes at least one group of detectors in echelon position.

16. Apparatus as in claim 15 in which signal delay means is placed in series with at least one of each pair of adjacent detectors.

17. Apparatus as in claim 7 in which said character of said signal is the amplitude of said signal.

References Cited in the file of this patent

UNITED STATES PATENTS

| | | |
|---|---|---|
| 2,540,654 | Cohen et al. | Feb. 6, 1951 |
| 2,590,091 | Devol | Mar. 25, 1952 |
| 2,659,072 | Coales et al. | Nov. 10, 1953 |
| 2,698,427 | Steele | Dec. 28, 1954 |
| 2,709,204 | Holmes | May 24, 1955 |
| 2,771,595 | Hendrickson et al. | Nov. 20, 1956 |
| 2,817,829 | Lubkin | Dec. 24, 1957 |
| 2,955,277 | Shelton | Oct. 4, 1960 |
| 3,030,441 | Nemeth | Apr. 17, 1962 |